Figure 1:
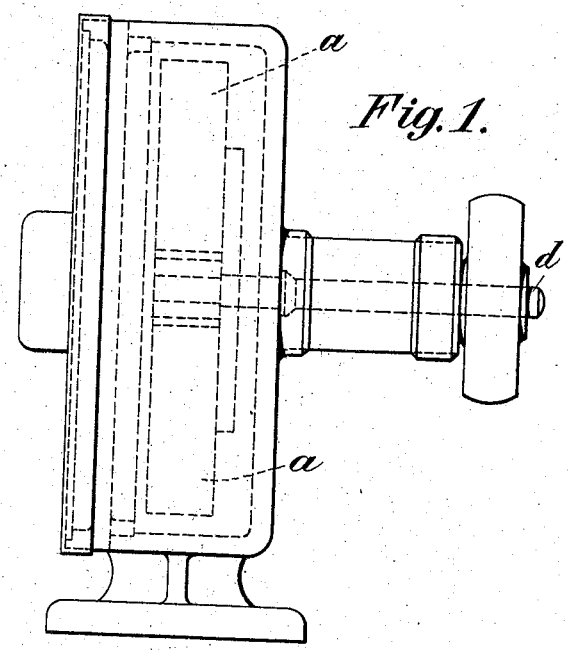

No. 815,708. PATENTED MAR. 20, 1906.
G. IHLE.
SPEED INDICATOR.
APPLICATION FILED MAY 13, 1905.

3 SHEETS—SHEET 1.

WITNESSES:

INVENTOR
Gustav Ihle
BY

ATTORNEYS

No. 815,708. PATENTED MAR. 20, 1906.
G. IHLE.
SPEED INDICATOR.
APPLICATION FILED MAY 13, 1905.

3 SHEETS—SHEET 2.

WITNESSES:
W. M. Avery
W. Harrison

INVENTOR
Gustav Ihle
BY
ATTORNEYS

No. 815,708. PATENTED MAR. 20, 1906.
G. IHLE.
SPEED INDICATOR.
APPLICATION FILED MAY 13, 1905.

3 SHEETS—SHEET 3.

WITNESSES:
W. M. Avery
W. Harrison

INVENTOR
Gustav Ihle
BY
[signature]
ATTORNEYS

UNITED STATES PATENT OFFICE.

GUSTAV IHLE, OF BERLIN, GERMANY, ASSIGNOR TO MAX STEINBERG, OF CHARLOTTENBURG, NEAR BERLIN, GERMANY, AND MAX TRITTER, OF BERLIN, GERMANY.

SPEED-INDICATOR.

No. 815,708.     Specification of Letters Patent.     Patented March 20, 1906.

Application filed May 13, 1905. Serial No. 260,305.

*To all whom it may concern:*

Be it known that I, GUSTAV IHLE, engineer, of 4 Alexandrinenstrasse, Berlin, Germany, have invented certain new and useful Improvements in Speed - Indicators, of which the following is a specification.

The present invention has for its object an improvement in speed - indicators with magnets and indicating members rotating around the same axis.

In accordance with the invention the indicating member, which is connected in the usual manner with the indicating mechanism, consists of a hollow body and is inclosed upon the greater part of its periphery by the rotated magnet system, an iron core which rotates with the system of magnets extending into this hollow indicating member. Owing to this arrangement, it is possible to employ a system of magnets forming a considerable mass as it is driven, while the hollow indicating member may be of exceedingly small mass. The employment of a system of magnets of large mass is of great importance for obtaining a powerful magnetic field. On the other hand, as the hollow indicating member is situated in a specially powerful magnetic field its mass may be kept comparatively small and yet the rotary field generated by the eddy-currents flowing through it may be powerful. A further advantage consists in the fact that the light hollow indicating member, which may advantageously be made of aluminium, is readily able to follow the momentary variations of velocity, as the bearing friction is extremely small in view of the small mass of the rotary body. By this means, therefore, the exactness of the indications is largely increased. The novel arrangement likewise presents the advantage that the magnetic circuit is almost completely closed and the entire periphery or almost the entire periphery of the hollow indicating body is effectively acted upon by the magnetic lines of force. Owing to the provision of the iron core filling the hollow indicating body, the air resistance is decreased and a magnetic field of greater density is obtained, and this results in great sensitiveness in the indicating.

Constructional forms of the novel speed-indicator are illustrated, by way of example, in the accompanying drawings, in which—

Figure 2:
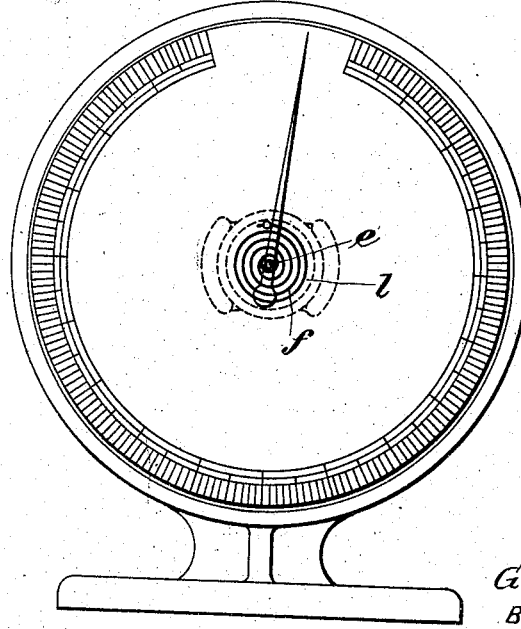
Figure 3:
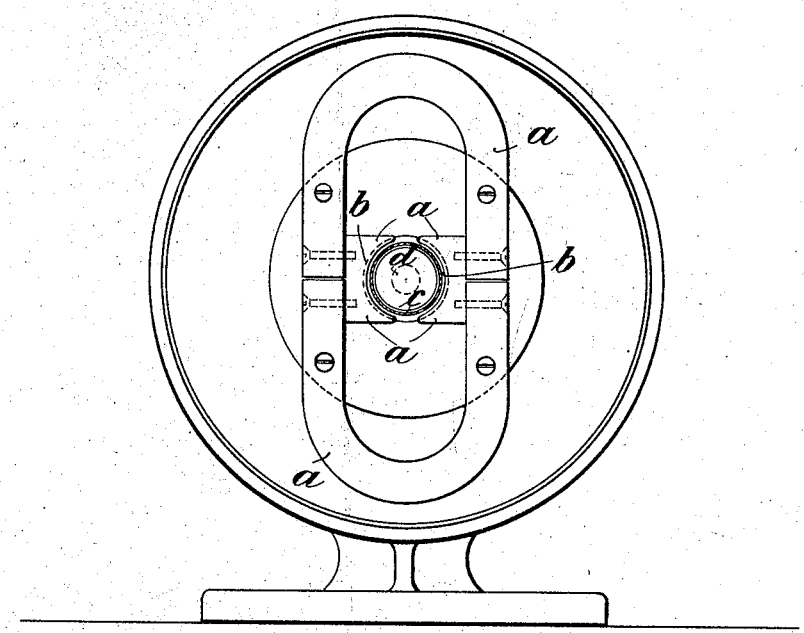
Figure 4:
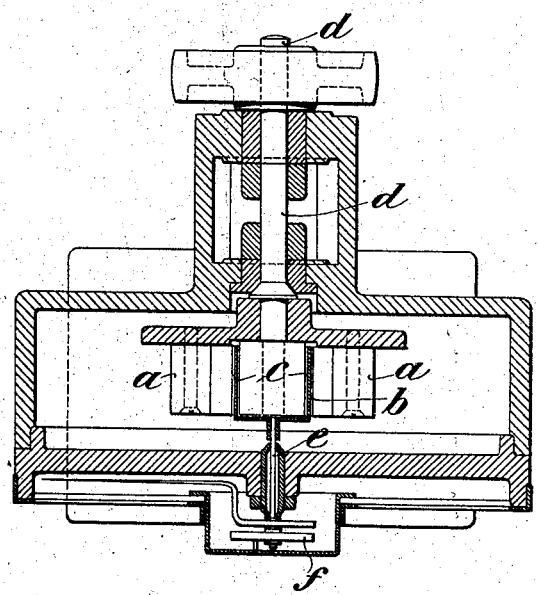
Figure 5:
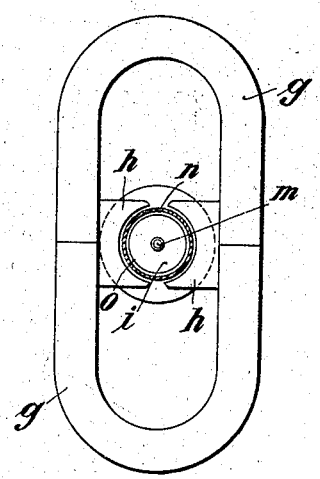
Figure 6:
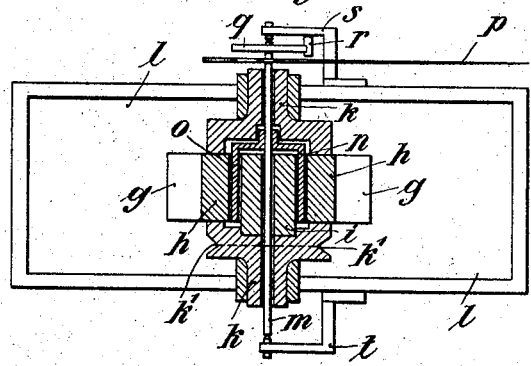

Figures 1 to 4 illustrate one constructional form of this speed-indicator. Fig. 1 is a side elevation. Fig. 2 is a front elevation looking at the scale. Fig. 3 is a rear elevation looking at the system of magnets. Fig. 4 is a plan view in horizontal section. Figs. 5 and 6 illustrate another constructional form. Fig. 5 is a side elevation of the system of magnets without the casing, and Fig. 6 is a sectional plan.

The speed - indicator in accordance with Figs. 1 to 4 consists of a system of magnets $a$ in the field $b$ of the lines of force of which an aluminium body $c$ is situated. The system of magnets $a$ is mounted upon a shaft $d$ the velocity of which it is desired to measure. The aluminium body $c$ is mounted upon a spindle $e$ which is rotatable, and upon one of its ends a spiral spring $f$ is fixed, its other extremity being arranged in the casing. Now if the system of magnets is rotated eddy-currents are set up in the aluminium body $c$. Owing to the mutual reactions of the system of magnets and of the aluminium body traversed by eddy-currents, this latter will be rotated until equilibrium is established, with the force of the spring $f$ opposing this rotation. The speed obtaining for the time being may be read by means of the index and scale.

In the constructional form illustrated in Figs. 5 and 6 the horseshoe-magnets $g$ $g$, together with their pole-pieces $h$ $h$ and the iron core $i$ connected with the magnets, constitute a system of magnets which by means of the hollow trunnions $k$, the velocity of which it is desired to measure, is rotatably mounted upon a stand $l$ in bearings upon one or both sides. The magnetic system may conveniently be driven by means of a cord which is passed around one of the trunnions $k$, formed as a cord-pulley $k'$, and around the shaft the velocity of which is to be determined. Upon a spindle $m$, passing freely through the trunnions $k$, the indicating member $n$, which is formed as a cylindrical hollow body, is mounted in such a manner that it rotates concentrically between the pole-pieces $h$ $h$ and the iron core $i$, connected with the magnetic system in the field $o$ of lines of force. The shaft $m$ is provided with an index $p$, which passes over the scale. A spring $q$, one end of which is likewise attached to the shaft $m$, tends to retractively rotate the index $p$ in opposition to the rotation of the indicating member $n$. The other extremity of the spring $q$ is attached at $r$ to a special arm $s$, mounted upon the stand $l$, and in this arm, in combination with a second arm $t$, the spindle $m$ is mounted in such a manner that it is impossible for the indicating-body $n$ to be displaced by friction.

The details of the invention may of course be modified. This is especially the case with reference to the mounting of the hollow indicating member, for which bearings may be provided upon one or upon both sides.

The indicating-body may be constructed of any appropriate metal. In the present case aluminium has been selected in order to keep the weight of the indicating-body as small as possible. An essential point is that in all cases the indicating member constituted by a hollow body should be inclosed on the greater part of its periphery by the rotated system of magnets and that an iron core rotating with the system of magnets should extend within the hollow body.

Having now particularly described and ascertained the nature of my said invention and in what manner the same is to be performed, I declare that what I claim is—

1. In a speed-indicator, the combination of magnets mounted upon trunnions, means for rotating said magnets upon said trunnions, an armature disposed within the field of said magnets, and indicating mechanism connected with said armature.

2. In a speed-indicator, the combination of magnets mounted upon trunnions and provided with pole-pieces, an armature disposed intermediate of said pole-pieces and adapted to have eddy-currents set up therein, a spindle connected with said armature for supporting the same, said spindle extending through said trunnions of said magnets, bearings for supporting said spindle, indicating mechanism connected with said spindle, and means for rotating said magnets.

3. In a speed-indicator, the combination of an indicating member rotating around an axis, magnets free to rotate around the same axis, said magnets producing a field, a hollow metallic member mounted within said field and connected with said indicating member, said hollow metallic member being inclosed for the greater part of its periphery by said magnets, and an iron core extending into said hollow metallic member for the purpose of facilitating the formation of eddy-currents therein.

4. In a speed-indicator, the combination of magnets provided with means whereby they may be rotated, said magnets producing a field, a hollow metallic member disposed within said field and inclosed for the greater part of its periphery by the poles of the magnets, trunnions for supporting said magnets, said trunnions being provided with axial passages, and a spindle revolubly mounted within said axial passages and connected with said hollow metallic member for supporting the same.

5. In a speed-indicator, the combination of means for producing a magnetic field, a magnetic member mounted within said magnetic field and coacting therewith for the purpose of increasing the magnetic flux, a hollow metallic member encircling said magnetic member and disposed within said magnetic field, bearings for enabling said hollow metallic member to rotate, and an indicating-needle connected with said member for exhibiting the movements thereof.

In testimony whereof I have hereunto set my hand, in presence of two subscribing witnesses, this 1st day of May, 1905.

GUSTAV IHLE.

Witnesses:
WOLDEMAR HAUPT,
HENRY HASPER.